US008585795B2

(12) United States Patent
Sigmund et al.

(10) Patent No.: US 8,585,795 B2
(45) Date of Patent: Nov. 19, 2013

(54) CERAMIC NANOFIBERS FOR LIQUID OR GAS FILTRATION AND OTHER HIGH TEMPERATURE (> 1000° C.) APPLICATIONS

(75) Inventors: Wolfgang M. Sigmund, Gainesville, FL (US); Vasana Maneeratana, Gainesville, FL (US); Paolo Colombo, Padua (IT); Chang-Yu Wu, Gainesville, FL (US); Hyoungjun Park, Gainesville, FL (US); Qi Zhang, Gainesville, FL (US)

(73) Assignee: Univesity of Florida Research Foundation, Inc., Gainesville, FL (US)

(*) Notice: Subject to any disclaimer, the term of this patent is extended or adjusted under 35 U.S.C. 154(b) by 669 days.

(21) Appl. No.: 12/530,703

(22) PCT Filed: Mar. 12, 2008

(86) PCT No.: PCT/US2008/056649
§ 371 (c)(1),
(2), (4) Date: Jan. 26, 2010

(87) PCT Pub. No.: WO2008/112755
PCT Pub. Date: Sep. 18, 2008

(65) Prior Publication Data
US 2010/0139226 A1    Jun. 10, 2010

Related U.S. Application Data

(60) Provisional application No. 60/894,338, filed on Mar. 12, 2007.

(51) Int. Cl.
| | | |
|---|---|---|
| *B01D 39/06* | (2006.01) | |
| *B01D 39/14* | (2006.01) | |
| *B01D 24/00* | (2006.01) | |
| *B01D 50/00* | (2006.01) | |
| *D02G 3/00* | (2006.01) | |
| *B32B 5/16* | (2006.01) | |
| *F16J 15/20* | (2006.01) | |
| *B32B 9/00* | (2006.01) | |

(52) U.S. Cl.
USPC ............. 55/523; 55/522; 55/524; 422/169; 422/170; 422/171; 422/172; 422/177; 422/178; 422/179; 422/180; 422/181; 422/182; 428/359; 428/360; 428/361; 428/362; 428/363; 428/364; 428/365; 428/366; 428/367

(58) Field of Classification Search
USPC ............ 55/522–524; 422/169–172, 177–182; 428/359–367
See application file for complete search history.

(56) References Cited

U.S. PATENT DOCUMENTS 7,105,124 B2    9/2006 Choi
7,591,883 B2 *  9/2009 Kameoka et al. ............... 95/273

(Continued)

FOREIGN PATENT DOCUMENTS

EP         1652573      5/2006
WO    WO 2005/044723    5/2005

*Primary Examiner* — Amber Orlando
(74) *Attorney, Agent, or Firm* — Saliwanchik, Lloyd & Eisenschenk

(57) ABSTRACT

In accordance with the invention there are devices and processes for making ceramic nanofiber mats and ceramic filters for use in high temperature and in corrosive environments. The process for forming a ceramic filter can include electrospinning a preceramic polymer solution into a preceramic polymer fiber having a diameter from about 10 nm to about 1 micron and forming a preceramic polymer fiber web from the preceramic polymer fiber onto a collector. The process can also include pyrolyzing the preceramic polymer fiber web to form a ceramic nanofiber mat having a diameter less than the diameter of the preceramic polymer fiber, the ceramic nanofiber mat comprising one or more of an oxide ceramic and a non-oxide ceramic such that the ceramic fiber mat can withstand temperature greater than about 1000 ° C.

7 Claims, 2 Drawing Sheets

(56) References Cited

U.S. PATENT DOCUMENTS

| | | |
|---|---|---|
| 2003/0177909 A1* | 9/2003 | Koslow .......................... 96/154 |
| 2005/0095695 A1* | 5/2005 | Shindler et al. ............ 435/285.1 |
| 2005/0287042 A1* | 12/2005 | Chase et al. .................... 422/88 |
| 2006/0065021 A1* | 3/2006 | Khatri et al. .................... 65/393 |
| 2006/0068668 A1* | 3/2006 | Kameoka et al. ............. 442/340 |
| 2006/0148978 A1* | 7/2006 | Reneker et al. ............... 524/556 |
| 2006/0159916 A1* | 7/2006 | Dubrow et al. ............... 428/357 |
| 2007/0190880 A1* | 8/2007 | Dubrow et al. ............... 442/181 |
| 2007/0269655 A1* | 11/2007 | Joo et al. ....................... 428/365 |

* cited by examiner

CERAMIC NANOFIBERS FOR LIQUID OR GAS FILTRATION AND OTHER HIGH TEMPERATURE (> 1000° C.) APPLICATIONS

CROSS-REFERENCE TO RELATED APPLICATION

The present application is the U.S. National Stage Application of International Patent Application No. PCT/US2008/056649, filed on Mar. 12, 2008, which claims the benefit of U.S. Provisional Application Serial No. 60/894,338, filed Mar. 12, 2007, both of which are hereby incorporated by reference herein in their entirety, including any figures, tables or drawings.

FIELD OF THE INVENTION

The subject matter of this invention relates to ceramic nanofibers. More particularly, the subject matter of this invention relates to systems and methods for using the ceramic nanofibers in high temperature and corrosive environments.

BACKGROUND OF THE INVENTION

Ceramic materials provide the benefit of being resistant to high temperature and corrosive environments and therefore ceramic filters can be used where filters made from other materials are not viable. Furthermore, electrospinning is an emerging technique for synthesizing nanofibers. Unlike other methods that produce short nanofibers, electrospinning produces continuous nanofibers. Currently, sol-gel approach is most commonly used technique for making ceramic nanofibers. However, the sol-gel approach has problems such as gelling, little control over rheological properties, and great sensitivity to environmental conditions such as humidity, and temperature, which in turn also affect the gelling of the material. Furthermore, the sol-gel approach is limited to oxide based systems.

Accordingly, the present invention solves these and other problems of the prior art to provide a new method of making ceramic nanofiber mats including ceramic nanofibers including one or more oxide ceramics and non-oxide ceramics for applications at high temperature and in corrosive environments.

SUMMARY OF THE INVENTION

In accordance with various embodiments, there is a process for forming a ceramic filter. The process can include electrospinning a preceramic polymer solution into a preceramic polymer fiber having a diameter from about 10 nm to about 1 micron and forming a preceramic polymer fiber web from the preceramic polymer fiber onto a collector. The process can also include pyrolyzing the preceramic polymer fiber web to form a ceramic nanofiber mat having a diameter less than the diameter of the preceramic polymer fiber, the ceramic nanofiber mat comprising one or more of an oxide ceramic and a non-oxide ceramic such that the ceramic fiber mat can withstand temperature greater than about 1000° C.

According to various embodiments, there is also a filter for high temperature application. The filter can include one or more of a porous substrate, a powder bed, and a fiber mat. The filter can also include a ceramic nanofiber mat including one or more of an oxide ceramic and a non-oxide ceramic over the one or more of the porous substrate, the powder bed, and the fiber mat, wherein the filter can have an efficiency of greater than approximately 99.97% for 300 nm size particles and a pressure drop of less than approximately 5.9 cm of water at an air flow velocity approximately of 5.3 cm/sec, the filter having a total thickness of less than approximately 1 mm.

According to another embodiment, there is a device including a filter. The filter can include a ceramic nanofiber mat over a substrate, the ceramic nanofiber mat including one or more of an oxide ceramic and a non-oxide ceramic, wherein the ceramic nanofiber mat can withstand a temperature greater than about 1000° C. and a corrosive environment, and wherein the filter can have an efficiency of greater than approximately 99.97% for 300 nm size particles and a pressure drop of less than approximately 5.9 cm of water at an air flow velocity of 5.3 cm/sec, the filter having a total thickness of less than about 1 mm.

According to yet another embodiment, there is a device including a ceramic nanofiber mat including one or more of an oxide ceramic and a non-oxide ceramic, wherein the ceramic fiber mat can provide catalyst support at a temperature greater than about 1000° C. and in one or more corrosive environments selected from the group consisting of alkaline solutions, acid solutions, biological fluids, hot gases, molten metals, and molten salts.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
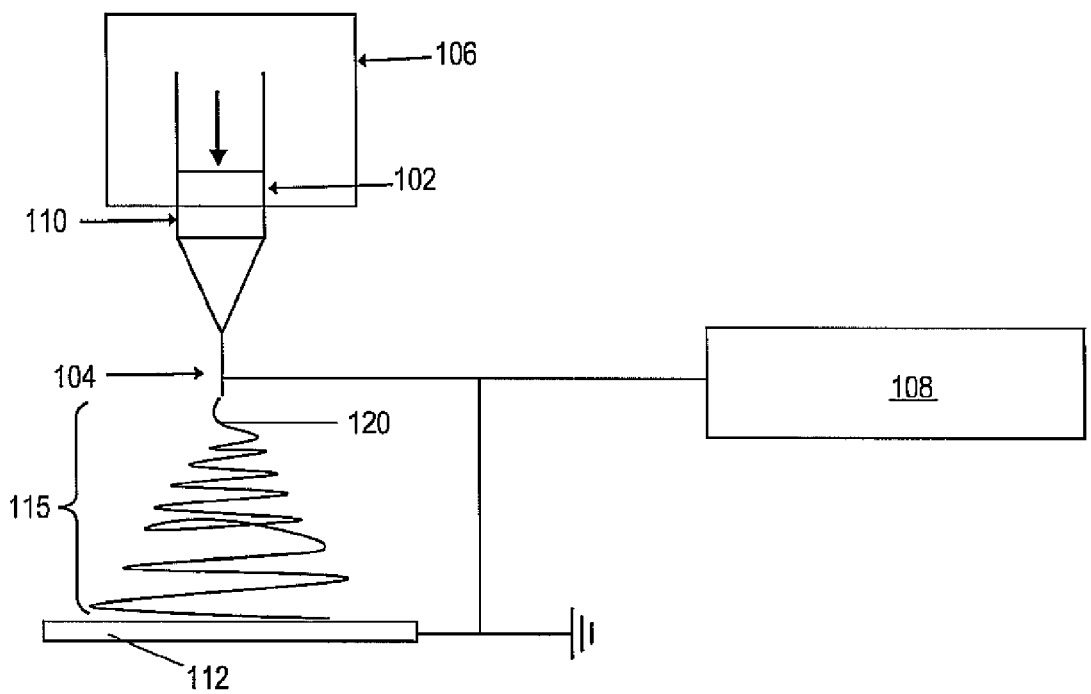
FIG. 1 depicts a schematic illustration of an exemplary apparatus for electrospinning.

According to various embodiments, there is a process for forming a ceramic filter including electrospinning a preceramic polymer solution 110 into a preceramic polymer fiber 120 having a diameter from about 10 nm to about 1 µm, as shown in FIG. 1. FIG. 1 shows a schematic illustration of an exemplary apparatus for electrospinning. In various embodiments, the process for forming a ceramic filter can also include preparing a preceramic polymer solution 110 for electrospinning. One of ordinary skill in the art would know that the preceramic polymers include organoelement polymers composed of a chain of main group inorganic elements with organic appendages. Preceramic polymers convert to amorphous network of inorganic elements, or amorphous covalent ceramic when heated to a temperature in the range of about 400° C. to about 1200° C., but can transform into a crystalline ceramic upon subsequent heat treatment at temperatures higher than about 1200° C. In various embodiments, exemplary preceramic polymer solution can include one or more of polysilsesquioxanes, polycarbosilanes, polysilanes, polysilazanes, alumoxanes, polyborazines, and other polymeric precursors including one or more of zirconium, titanium, magnesium, boron, and phosphorus. In some embodiments, polymer precursors can include elements other than zirconium, titanium, magnesium, boron, and phosphorus. In some embodiments, the preceramic polymer solution can include one or more surfactant for stabilization. Exemplary surfactants include but are not limited to dodecyltriammonium bromide, poly(vinyl alcohol), and poly (vinyl pyrrolidone).

As shown in FIG. 1, the electrospinning of preceramic polymer solution 110 into preceramic polymer fiber 120 can include squeezing a small amount of preceramic polymer solution 110 out of a metallic needle 104 of a syringe 102 using the syringe pump 106. The metallic needle 104 can have an aperture from about 10 µm to about 3 cm. The metallic needle 104 can be attached to a high voltage source 108 either positive or negative. The electrospinning of preceramic polymer solution 110 into preceramic polymer fiber 120 can also include applying a high voltage to the droplet formed at the end of the metallic needle 104. Additional forces due to the applied high voltage in addition to the surface tension and gravity can transform the droplet into a Taylor cone 115 as shown in FIG. 1. Furthermore, depending upon the experimental conditions a jet can then start to whip close to the collector 112 that causes it to form a preceramic polymer fiber 120 as thin as about few hundred nanometers to about tenths of nanometers. In some embodiments, an electric field in the range of about 0.5 kV/cm to about 6 kV/cm can be applied in air. In other embodiments, an electric field greater than about 6 KV/cm can be applied in $SF_6$ environment. In various embodiments, a flow rate of the preceramic polymer solution 110 can be from about 1 cc/hr to about 25 cc/hr.

Figure 2:
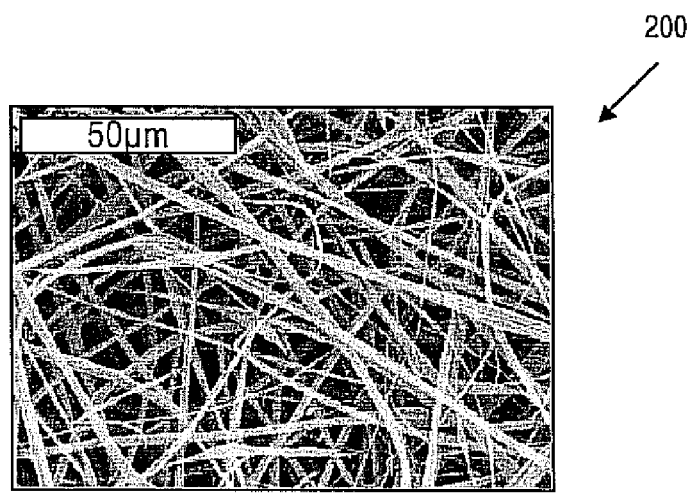
FIG. 2 shows an exemplary preceramic polymer fiber web including organic polymer before pyrolysis.

The process for forming a ceramic filter can further include forming a preceramic polymer fiber web, as shown in FIG. 2 from the preceramic polymer fiber 120 onto a collector 112 and pyrolyzing the preceramic polymer fiber web to form a ceramic nanofiber mat having a diameter less than the diameter of the preceramic polymer fiber 120. In various embodiments, the ceramic nanofiber mat can include one or more of an oxide ceramic and a non-oxide ceramic, wherein the ceramic nanofiber mat can withstand temperature greater than about 1000° C. In some embodiments, the pyrolysis of the preceramic polymer fiber web can be carried out at a temperature greater than about 400° C. for polymer to ceramic conversion. In some embodiments, the pyrolysis can be carried out in an inert environment including, but not limited to, He, Ar, $N_2$, and vacuum. In other embodiments, the pyrolysis can be carried out in a reactive environment including but not limited to air, $NH_3$, $O_2$, chlorine-containing gases, and hydrocarbon-containing gases. In various embodiments, the ceramic nanofiber mat can withstand one or more corrosive environments selected from the group consisting of alkaline solutions, acid solutions, biological fluids, hot gases, molten metals, and molten salts. In some embodiments, the process for forming a ceramic filter can also include crosslinking the preceramic polymer fiber web by one or more of oxidation, electron beam irradiation, radiation curing, reaction with a gas, introduction of specific catalyst agents in the preceramic polymer solution, and controlled thermal treatment before the step of pyrolysis in order to maintain the shape of a preformed body of the ceramic nanofiber mat. In various embodiments, the process for forming a ceramic filter can also include adding one or more fillers to the preceramic polymer solution 110 in order to control both the shrinkage and the final dimensions of the ceramic nanofiber mat. In some embodiments, one or more fillers can be added to modify the chemical and mechanical properties of the ceramic nanofiber mat. In other embodiments, the process can include adding nano sized fillers to the preceramic polymer solution 110. In some other embodiments, the fillers can include one or more of alumina powder, zirconia powder, apatite, bio-active powders, magnesia powder, titania powder, carbon nanotubes, activated carbon, metal colloids, nano-particles, meso-porous particles, organic fillers, mesoporous block co-polymers, and high porosity organic templating systems.

Figure 3:
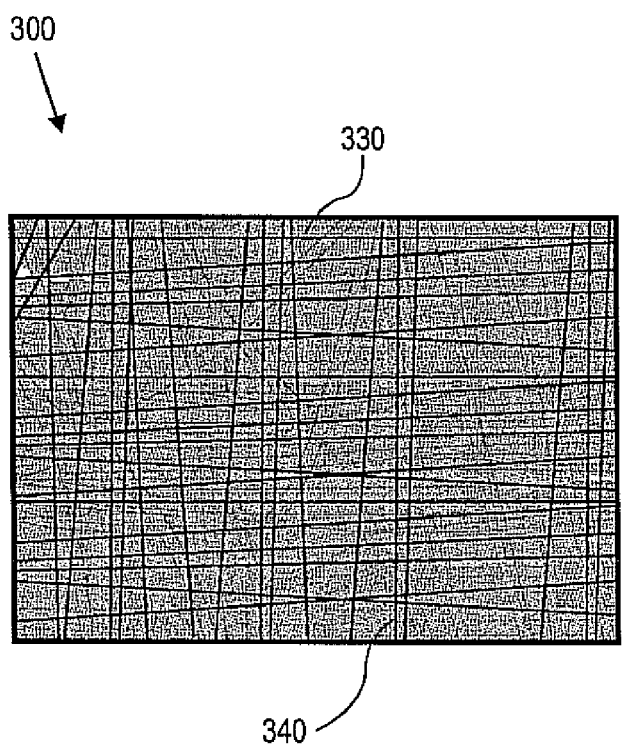
FIG. 3 shows an exemplary filter, according to various embodiments of the present teachings.

According to various embodiments, there is a filter 300, as shown in FIG. 3 for high temperature application including one or more of a porous substrate, a powder bed, and a fiber mat 330 and a ceramic nanofiber mat 340 including one or more of an oxide ceramic and a non-oxide ceramic over one or more of the porous substrate, the powder bed, and the fiber mat 330, wherein the filter 300 can have an efficiency of greater than approximately 99.97% for 300 nm size particles and a pressure drop of less than approximately 5.9 cm of water at an air flow velocity approximately of 5.3 cm/sec, the filter 300 can have a total thickness of less than approximately 1 mm. In some cases, the filter 300 can have a total thickness of less than approximately 100 µm and in other cases, less than approximately 30 µm. In some embodiments, the ceramic nanofiber mat 340 can include one or more ceramic material selected from the group consisting of SiC, SiOC, $Si_3N_4$, SiCN, SiBCN, AlN, BN, BC, SiAlON, $SiO_xN_y$, and SiOCN. In other embodiments, the ceramic material can further include one or more elements selected from the group consisting of zirconium, titanium, magnesium, boron, and phosphorus. One of the advantages of a filter including the ceramic nanofiber mat 340 is the dramatic pressure drop decrease across the filter membrane due to the nano size of the diameter of the filter media, i.e. the ceramic nanofiber mat 340. In various embodiments, the ceramic fiber mat 340 can be prepared by the disclosed method including the steps of electrospinning a preceramic polymer solution into a preceramic polymer fiber having a diameter from about 10 nm to about 1 micron, forming a preceramic polymer fiber web from the preceramic polymer fiber onto one or more of a porous substrate, a powder bed, and a fiber mat, and pyrolyzing the preceramic polymer fiber web to form the ceramic nanofiber mat. In some embodiments, the ceramic nanofiber mat can include one or more fillers. In other embodiments, the ceramic nanofiber mat can include one or more nanosized fillers. In various embodiments, the ceramic nanofiber mat 340 can include one or more of alumina powder, zirconia powder, apatite, bio-active powders, magnesia powder, titanic powder, carbon nanotubes, activated carbon, metal colloids, nano-particles, meso-porous particles, organic fillers, mesoporous block co-polymers, and high porosity organic templating systems.

According to various embodiments, there is a device (not shown) including a filter including a ceramic nanofiber mat including one or more of an oxide ceramic and a non-oxide ceramic, wherein the ceramic nanofiber mat can withstand a temperature greater than about 1000° C. and a corrosive environment, wherein the filter has an efficiency of greater than approximately 99.97% for 300 nm size particles and a pressure drop of less than approximately 5.9 cm of water at an air flow velocity of 5.3 cm/sec, the filter having a total thickness of less than about 1 mm. In some cases, the filter can have a total thickness of less than approximately 100 μm and in other cases, less than approximately 30 μm. In some embodiments, the ceramic nanofiber mat can include one or more of ceramic material selected from the group consisting of SiC, SiOC, $Si_3N_4$, SiCN, SiBCN, AlN, BN, BC, SiAlON, $SiO_xN_y$, and SiOCN. In other embodiments, the ceramic material can further include one or more elements selected from the group consisting of zirconium, titanium, magnesium, boron, and phosphorus. In other embodiments, the ceramic nanofiber mat can include one or more fillers. In other embodiments, the ceramic nanofiber mat can include one or more nanosized fillers. In some other embodiments, the ceramic nanofiber mat can include one or more of alumina powder, zirconia powder, apatite, bio-active powders, magnesia powder, titania powder, carbon nanotubes, activated carbon, metal colloids, nano-particles, meso-porous particles, organic fillers, mesoporous block co-polymers, and high porosity organic templating systems.

According to another embodiment, there is a device including a ceramic nanofiber mat, wherein the ceramic fiber mat including one or more of an oxide ceramic and a non-oxide ceramic provides catalyst support at a temperature greater than about 1000° C. and in one or more corrosive environments selected from the group consisting of alkaline solutions, acid solutions, biological fluids, hot gases, molten metals, and molten salts. In some embodiments, the ceramic nanofiber mat can include one or more ceramic material selected from the group consisting of SiC, SiOC, $Si_3N_4$, SiCN, SiBCN, AlN, BN, BC, SiAlON, $SiO_xN_y$, and SiOCN. In other embodiments, the one or more ceramic material can further include one or more elements selected from the group consisting of zirconium, titanium, magnesium, boron, and phosphorus. In certain embodiments, the ceramic nanofiber mat can include one or more fillers. In other embodiments, the ceramic nanofiber mat can include one or more nanosized fillers. In various embodiments, the ceramic nanofiber mat can include one or more of alumina powder, zirconia powder, apatite, bio-active powders, magnesia powder, titania powder, carbon nanotubes, activated carbon, metal colloids, nano-particles, meso-porous particles, organic fillers, mesoporous block co-polymers, and high porosity organic templating systems.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices have various different properties and uses in accordance with the disclosure above and as pointed out hereinafter.

EXAMPLES

Example 1

Preparation of SiC Nanofibermat

Silicon Carbide fibers can be electrospun by mixing a precursor of SiC, such as allylhydridopolycarbosilane (AHPCS) and polyethylene oxide (PEO) in chloroform. Electrospun fibermats can then be converted to SiC nanofibermat by calcination and sintering in air at temperature in the range of about 800° C. to about 1000° C.

Example 2

Preparation of SiC Nanofibermat

Silicon carbide nanofibermat can be prepared by electrospinning a precursor solution including allylhydridopolycarbosilane (AHPCS) and polyacrylonitrile (PAN) having a weight average molecular weight of 150,000 in dimethylformamide (DMF). After electrospinning, the precursor fibermat can be converted to the SiC nanofibermat by thermal treatment in an inert atmosphere, such as, nitrogen as follows: room temperature to about 650° C. at about 1° C./minute, followed by increasing the temperature to about 850° C. at about 3° C./minute, and then calcining at 850° C. for about 1 hour.

Example 3

Preparation of $TiO_2$ Nanofibermat

Titanium alkoxides, such as Titanium (IV) isopropoxide (TiPP) can be combined with ethyl ethanol, glacial acetic acid, water, and polyvinylpyrrolidone) (PVP) having a weight average molecular weight of 1,300,000. The precursor solution can be then electrospun. The collected fibermat can be converted to TiO2 nanofibermat by first ramping the temperature from room temperature to 500° C. at 10° C./minute in air and then calcining at about 500° C. for about 3 hours.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A filter for high temperature application comprising:
a ceramic nanofiber mat comprising only one electrospun continuous fiber, the continuous fiber comprises one or more ceramic materials selected from the group consisting of SiC, SiOC, $Si_3N_4$, SiCN, SiBCN, AlN, BN, BC, SiAlON, $SiOxN_y$, and SiOCN,
wherein the fiber has a diameter of 10 nm to 1 micron.

2. The filter of claim 1, wherein the continuous fiber further comprises one or more elements selected from the group consisting of zirconium, titanium, magnesium, boron, and phosphorus.

3. The filter of claim 1, wherein the ceramic nanofiber mat comprises one or more fillers.

4. The filter of claim 3 wherein the ceramic nanofiber mat comprises nanosized fillers.

5. The filter of claim 3 wherein the fillers comprise one or more of alumina powder, zirconia powder, apatite, bio-active powders, magnesia powder, titania powder, carbon nanotubes, activated carbon, metal colloids, nano-particles, mesoporous particles, organic fillers, mesoporous block co-polymers, and high porosity organic templating systems.

6. The filter of claim 1, wherein the ceramic nanofiber mat is over a porous substrate, and wherein the ceramic nanofiber mat can withstand a temperature greater than about 1000° C. and a corrosive environment.

7. The filter of claim 6 wherein the corrosive environments is selected from the group consisting of alkaline solutions, acid solutions, biological fluids, hot gases, molten metals, and molten salts.

* * * * *

UNITED STATES PATENT AND TRADEMARK OFFICE
CERTIFICATE OF CORRECTION

PATENT NO. : 8,585,795 B2
APPLICATION NO. : 12/530703
DATED : November 19, 2013
INVENTOR(S) : Wolfgang M. Sigmund et al.

It is certified that error appears in the above-identified patent and that said Letters Patent is hereby corrected as shown below:

Title Page,
Item (73) Assignee, "Univesity of Florida Research Foundation, Inc., Gainesville, FL (US)" should read --University of Florida Research Foundation, Inc., Gainesville, FL (US)--.

Signed and Sealed this
Twentieth Day of May, 2014

Michelle K. Lee
*Deputy Director of the United States Patent and Trademark Office*